United States Patent
Kadota

(10) Patent No.: US 7,500,042 B2
(45) Date of Patent: Mar. 3, 2009

(54) ACCESS CONTROL DEVICE FOR BUS BRIDGE CIRCUIT AND METHOD FOR CONTROLLING THE SAME

(75) Inventor: Daisuke Kadota, Miyazaki (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 582 days.

(21) Appl. No.: 10/252,419

(22) Filed: Sep. 24, 2002

(65) Prior Publication Data

US 2003/0149826 A1 Aug. 7, 2003

(30) Foreign Application Priority Data

Feb. 5, 2002 (JP) .............................. 2002-028456

(51) Int. Cl.
G06F 13/36 (2006.01)
G06F 13/00 (2006.01)
G06F 13/372 (2006.01)
G06F 5/00 (2006.01)
G06F 1/00 (2006.01)

(52) U.S. Cl. .................. 710/306; 710/58; 710/107; 710/124; 710/309; 713/322; 713/501

(58) Field of Classification Search ................ 710/306, 710/309, 124, 107, 58; 713/600, 501, 322; 709/253, 100
See application file for complete search history.

(56) References Cited

U.S. PATENT DOCUMENTS

| | | | | |
|---|---|---|---|---|
| 5,325,521 A | * | 6/1994 | Koyama et al. | ................ 714/55 |
| 5,623,648 A | * | 4/1997 | Childs | ........................ 713/502 |
| 6,023,776 A | * | 2/2000 | Ozaki | .......................... 714/55 |
| 6,088,743 A | * | 7/2000 | Takeda | ......................... 710/52 |
| 6,216,217 B1 | * | 4/2001 | Seki | .............................. 712/33 |
| 6,324,653 B1 | * | 11/2001 | Lisart et al. | .................. 713/600 |
| 6,356,987 B1 | * | 3/2002 | Aulas | ......................... 711/167 |
| 6,434,082 B1 | * | 8/2002 | Hovis et al. | .................. 365/233 |
| 6,571,308 B1 | * | 5/2003 | Reiss et al. | ................. 710/315 |
| 6,594,718 B1 | * | 7/2003 | Ebner et al. | .................. 710/240 |
| 6,633,994 B1 | * | 10/2003 | Hofmann et al. | ............ 713/600 |
| 6,658,508 B1 | * | 12/2003 | Reiss et al. | .................. 710/100 |
| 6,748,464 B2 | * | 6/2004 | Mori et al. | ..................... 710/36 |

(Continued)

FOREIGN PATENT DOCUMENTS

| | | |
|---|---|---|
| GB | 2 339 369 A | 1/2000 |
| JP | 06-314255 | 11/1994 |
| JP | 08-212159 | 8/1996 |
| JP | 2000-112878 A | 4/2000 |

*Primary Examiner*—Khanh Dang
*Assistant Examiner*—Christopher A Daley
(74) *Attorney, Agent, or Firm*—Volentine & Whitt, P.L.L.C.

(57) ABSTRACT

An access control device having a number-of-waits setting circuit determining a wait periodicity corresponding to an operating speed of peripheral devices connected to a second bus according to an address corresponding to an access request to the second bus sent from a first bus, responsive to the access request, and a count value generator generating a count value up to the wait periodicity set to the number-of-waits setting circuit. A control signal holding circuit holds a control signal for holding a state of the second bus at the setting of the wait periodicity by the number-of-waits setting circuit during a count period of the count value generator and maintains the access state of the status controller. A clock control circuit divides a clock for the first bus according to the wait periodicity set and outputs the result of division to the second bus.

11 Claims, 14 Drawing Sheets

U.S. PATENT DOCUMENTS 6,751,723 B1 * 6/2004 Kundu et al. ................... 712/36
6,810,460 B1 * 10/2004 Kirkwood ................... 710/306
6,876,941 B2 * 4/2005 Nightingale ................ 702/120
2003/0110306 A1 * 6/2003 Bailis et al. ................. 709/253

* cited by examiner

ACCESS CONTROL DEVICE FOR BUS BRIDGE CIRCUIT AND METHOD FOR CONTROLLING THE SAME

BACKGROUND OF THE INVENTION

1. Field of the Invention

The present invention generally relates to an access control device for a bus bridge circuit, which are capable of accurately performing access control from a first bus to a second bus.

This application relies for priority on Japanese patent application, Serial Number 28456/2002, filed Feb. 5, 2002, which is incorporated herein by reference in its entirety.

2. Description of the Related Art

Electronic equipment or devices such as a cellular phone, an electronic notebook, car navigation equipment, etc. have been advanced in recent years. There has been an increasingly demand for a semiconductor chip equipped with an application-specific integrated circuit (ASIC) associated with the functions of these electronic equipment. Such a semiconductor chip builds therein a CPU and its associated circuits as core parts and includes parts other than those, which comprise a gate array and the like. The semiconductor chip is capable of making circuit design for respective applications. As a suitable example of this type of semiconductor chip, there is known, for example, an AMBA (Advanced Microcontroller Bus Architecture) manufactured by ARM Ltd. AMBA specifications are used to define the on-chip communication protocol or standard for designing high-performance 32-bit and 16-bit embedded microcontrollers refer to Japanese Laid Open Patent Application No. 2000-112878, for example).

FIG. 1 is a diagram for describing the present invention. Since, however, the prior art is also substantially identical to the present invention in overall configuration, the prior art will be explained with reference to the present drawing. In FIG. 1, a system bus 1 is used in a high-performance system module, and a peripheral bus 2 is used in low-power peripheral devices. A bus bridge circuit 3 performs protocol conversion between the system bus 1 and the peripheral bus 2. This is because since the width of the peripheral bus 2 is narrower than that of the system bus 1, both are different in bus protocol from each other. When a CPU 11 obtains data write or read access to a first peripheral device 21 in FIG. 1 by way of example, it is necessary to carry out protocol conversion from a system bus protocol to a peripheral bus protocol.

In the AMBA specifications, a dedicated module for performing such protocol conversion has been prepared. In the module, a decoder 14 decodes an AHB (Advanced High performance Bus) address signal for the system bus 1 to thereby generate a select signal and an internal error signal for each of respective peripheral devices 21, 22, . . . , 20 placed under an APB (Advanced Peripheral Bus). Further, an internal signal is generated which indicates that each address is placed within a predetermined area and access is made to the predetermined peripheral device 21, 22, . . . or 20. An APB address equivalent to its corresponding address within the predetermined peripheral device is generated from an AHB address. Thus, when one attempts to manufacture each electronic equipment through the use of the above-described semiconductor chip, it is advantageous to comply with the above AMBA specifications.

On the other hand, the CPU 11 and the peripheral device 21 or the like have made use of clocks identical in cycle or period upon access to the peripheral device 21 or the like from the CPU 11 using the bus protocol conversion module based on the AMBA specifications. A period for the access was fixed to two cycles of the clock. Therefore, there was a case in which the operation of the peripheral device 21 or the like was slow and uncompleted within the fixed access period, and no access was finished. On the other hand, there is also known a method of lowering the frequency of a clock to enable such access according to the AMBA specifications. According to the method, however, the capability of each high-performance device connected to the system bus 1 for the CPU 11 and the like came to naught without making use of the capability thereof.

SUMMARY OF THE INVENTION

According to one aspect of the present invention, there is provided an access control device which includes a number-of-waits setting circuit for determining a wait periodicity corresponding to an operating speed of each of peripheral devices connected to a second bus according to an address corresponding to an access request to the second bus sent from a first bus, in response to the access request, and a count value generator for generating a count value up to the wait periodicity set to the number-of-waits setting circuit.

The device also includes a control signal holding circuit for holding a control signal for holding a state of the second bus at the setting of the wait periodicity by the number-of-waits setting circuit during a count period of the count value generator and maintaining the access state of the status controller, and a clock control circuit for dividing a clock for the first bus according to the wait periodicity set to the number-of-waits setting circuit and outputting the result of division to the second bus.

The above and further objects and novel features of the invention will more fully appear from the following detailed description, appended claims and the accompanying drawings.

DETAILED DESCRIPTION OF THE PREFERRED EMBODIMENTS

Figure 1:
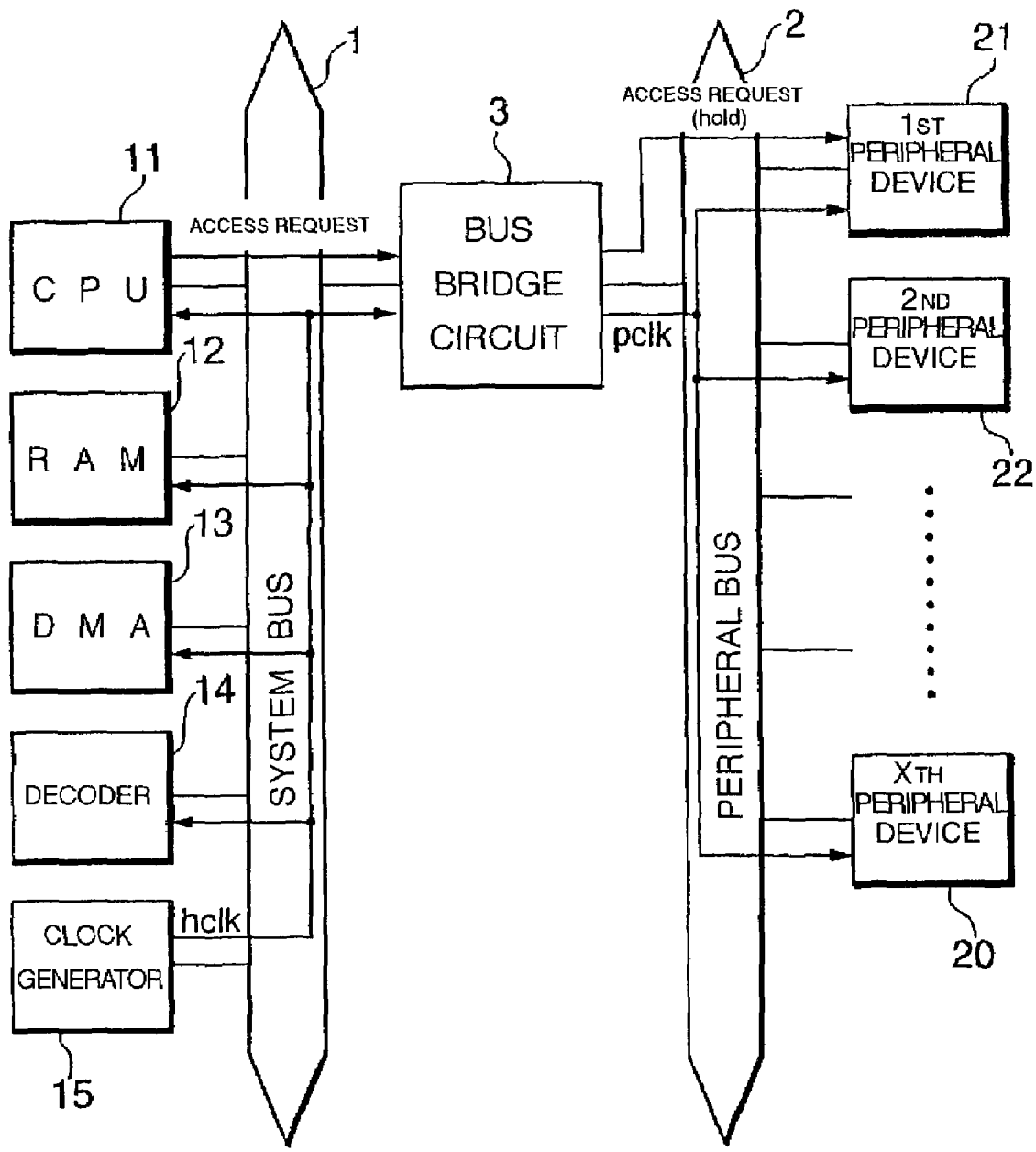
FIG. 1 is a diagram for describing a whole configuration of a data processing device equipped with a bus bridge circuit, of the present invention.

An access control device and method for controlling the same according to preferred embodiments of the present invention will be explained hereinafter with reference to figures. In order to simplify explanation, like elements are given like or corresponding reference numerals through this specification and figures. Dual explanations of the same elements are avoided.

The present invention provides a method of solving the above-described problems and a more specific apparatus. Namely, as one method, a method of determining a dividing ratio corresponding to an operating speed of the peripheral device 21 or the like connected to a second bus, which is specified by an address corresponding to an access request made from a first bus to the second bus, in response to the access request, dividing a clock for the first bus by the dividing ratio and outputting the divided clock to the second bus is adopted for the bus bridge circuit 3 for controlling a transfer of a signal between the system bus 1 corresponding to the first bus and the peripheral but 2 corresponding to the second bus. Along with it, the access request is held and the first bus is allowed to stand by over a clock cycle determined according to the operating speed of the peripheral device 21 or the like. On the other hand, the result of access sent via the second bus is transferred to the first bus after the completion of the operation of the peripheral device 21 or the like.

As methods related to the above method, there are provided a method of setting desired values from outside electronic equipment regardless of the address to thereby specify the dividing ratio and the clock cycle determined according to the operating speed of the peripheral device 21 or the like by the set values, and a method of setting a desired duty ratio from outside similarly, and allowing a clock obtained by dividing the clock for the first bus and outputted to the second bus to fall in a time determined by the duty ratio, of a time set between continuous rising edges thereof.

Figure 2:
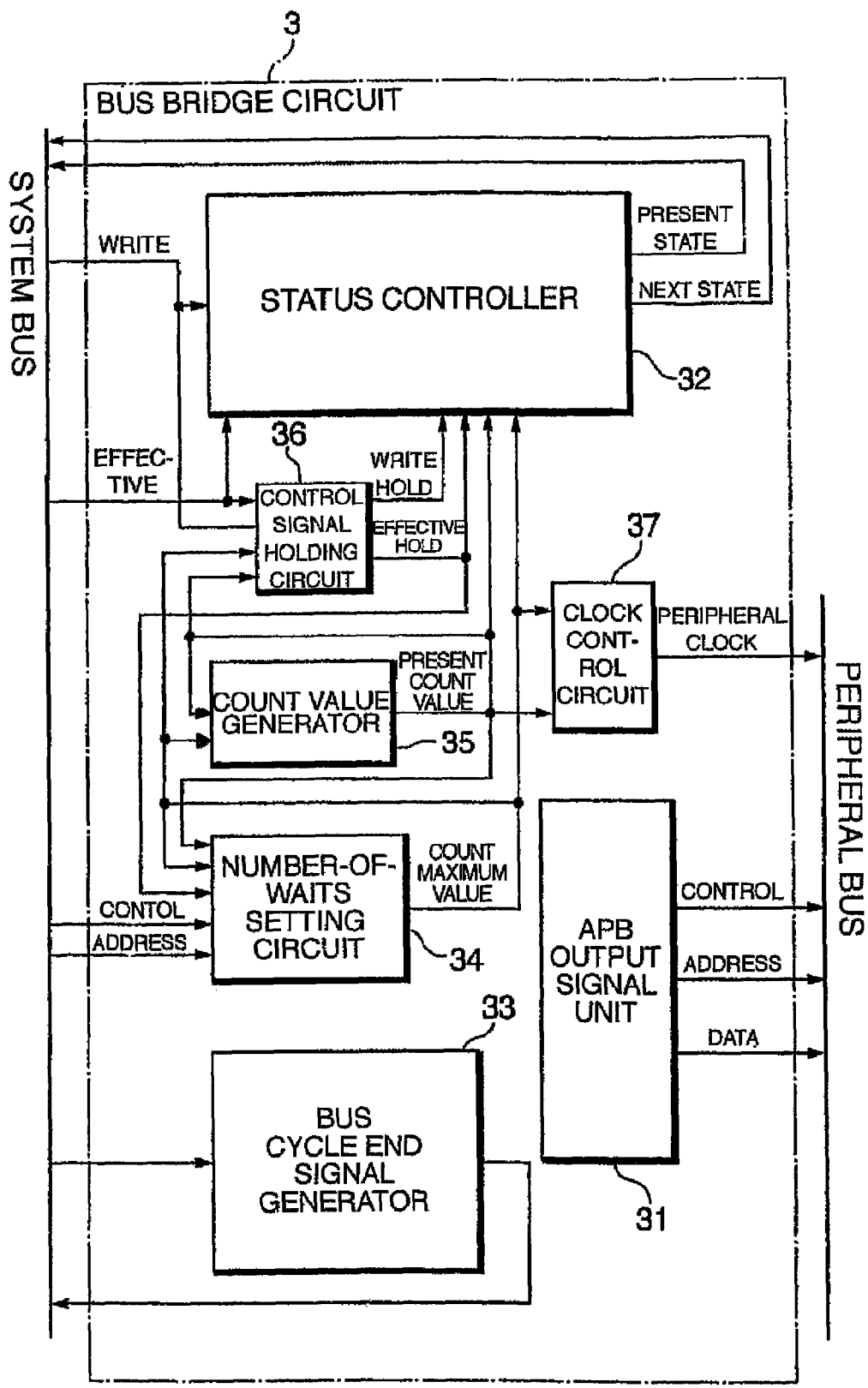
FIG. 2 is a diagram for describing a first embodiment of an access control device for the bus bridge circuit, of the present invention.

As one specific apparatus, there is provided an access control apparatus for a bus bridge circuit connected between a first bus and a second bus. As shown in FIG. 2, the present access control apparatus is suitable for use in a bus bridge circuit 3 provided with a status controller 32 for determining a state of access to both buses, and comprises a number-of-waits setting circuit 34 for determining a wait periodicity corresponding to an operating speed of a peripheral device 21 or the like connected to the second bus according to an address corresponding to an access request to the second bus sent from the first bus, in response to the access request, a count value generator 35 for generating a count value up to the wait periodicity set to the number-of-waits setting circuit 34, a control signal holding circuit 36 for holding a control signal for holding a state of the second bus at the setting of the wait periodicity by the number-of-waits setting circuit 34 during a count period of the count value generator 35 and maintaining the access state of the status controller 32, and a clock control circuit 37 for dividing a clock for the first bus according to the wait periodicity set to the number-of-waits setting circuit 34 and outputting the divided clock to the second bus.

As apparatuses related to it, there are provided an apparatus wherein the number-of-waits setting circuit 34 is capable of determining a wait periodicity according to a set value capable of being set and changed to a desired value from outside electronic equipment regardless of the address, and an apparatus wherein the clock control circuit sets a desired duty ratio from outside, and allows a clock obtained by dividing the clock for the first bus and outputted to the second bus to fall in a time determined by the desired duty ratio, of a time set between continuous rising edges thereof.

In response to an access request issued from a CPU 11, a bus bridge circuit 3 identifies, for example, a first peripheral device 21 from a plurality of peripheral devices according to an address corresponding to the access request. According to an operating speed of the first peripheral device 21, the bus bridge circuit 3 divides a system clock hclk generated from a clock generator 15 connected to a system bus 1 and outputs the divided one to the first peripheral device 21 via a peripheral bus 2 as a peripheral clock pclk. At this time, the dividing ratio may be varied manually from outside to cope with the replacement of each peripheral device. The bus bridge circuit 3 holds the access request of the CPU 11 therein over a predetermined cycle of the system clock hclk and allows the CPU 11 to wait or stand by.

On other hand, the peripheral device 21 performs an operation corresponding to the access request according to the peripheral clock pclk, and transfers the result of access to the CPU 11 via the peripheral bus 2 and the system bus 1 connected to the bus bridge circuit 3 after the completion of its operation. The frequency of the peripheral clock pclk and the waiting time of the CPU 11 are respectively set to suitable values corresponding to individual peripheral devices 21, 22, . . . , 20 according to each address from the CPU 11 decoded by a decoder 14 or settings made manually from outside. The peripheral clock pclk is also capable of adjusting its duty ratio so as to change falling timing alone. Thus, the CPU 11 is capable of accessing the peripheral device 21 or the like slow in operation while the clock frequency for the system bus 1 is being fixed without its adjustment. Operations of specific apparatuses will be explained in detail in the description of operations of apparatuses of embodiments illustrated in the modes for carrying out the invention, to be described later.

First Preferred Embodiment

Modes for carrying out the present invention will be described by illustrated embodiments. FIG. 1 is a diagram for describing a whole configuration of a data processing apparatus equipped with a bus bridge circuit, of the present invention. The data processing apparatus shown in the drawing is mounted on a single semiconductor chip. In FIG. 1, a system bus 1 corresponding to a first bus is a high-performance 32-bit bus based on AMBA specifications. A peripheral bus 2 corresponding to a second bus is a low bandwidth 16-bit bus based on the AMBA specifications. The respective buses comprise control buses, address buses and data buses respectively. The system bus 1 and the peripheral bus 2 are connected to each other by a bus bridge circuit 3 which performs bus protocol conversion between the these buses.

A CPU 11, a RAM 12, a DMA 13, a decoder 14, a clock generator 15 and unillustrated various devices are connected to the system bus 1. As is well known, the CPU 11 is a central device which performs various processes such as access to data stored in respective devices, utilization of read data, processing thereof and writing of the processed data therein, writing of new data therein, etc. The RAM 12 is a random access memory and use as a main storage device for the CPU 11. The DMA 13 is a direct memory access device and is a processing device for performing the transfer of data between the RAM 12 and a first peripheral device 21 or the like, for example as an alternative to the CPU 11. The decoder 14 decodes a control signal and an address signal outputted onto the control bus and address bus of the system bus 1 from the CPU 11 or DMA 13 and outputs a select signal for selecting any of peripheral devices 21, 22, . . . , 20 and a write signal indicative of whether or not the type of an access request corresponds to write or read.

The clock generator 15 outputs a clock for synchronizing operations of the respective devices connected to the system bus 1 to the system bus 1. On the other hand, the first, second, . . . , xth peripheral devices 21, 22, . . . , 20 are connected to the peripheral bus 2. They may be different from or identical to one another in operation performance. The number thereof x may be 1. They vary according to electronic equipment to which the data processing apparatus shown in FIG. 1 is applied. In the case of a cellular phone, for example, they are a keyboard input circuit, a display output circuit, a memory, etc.

Figure 3:
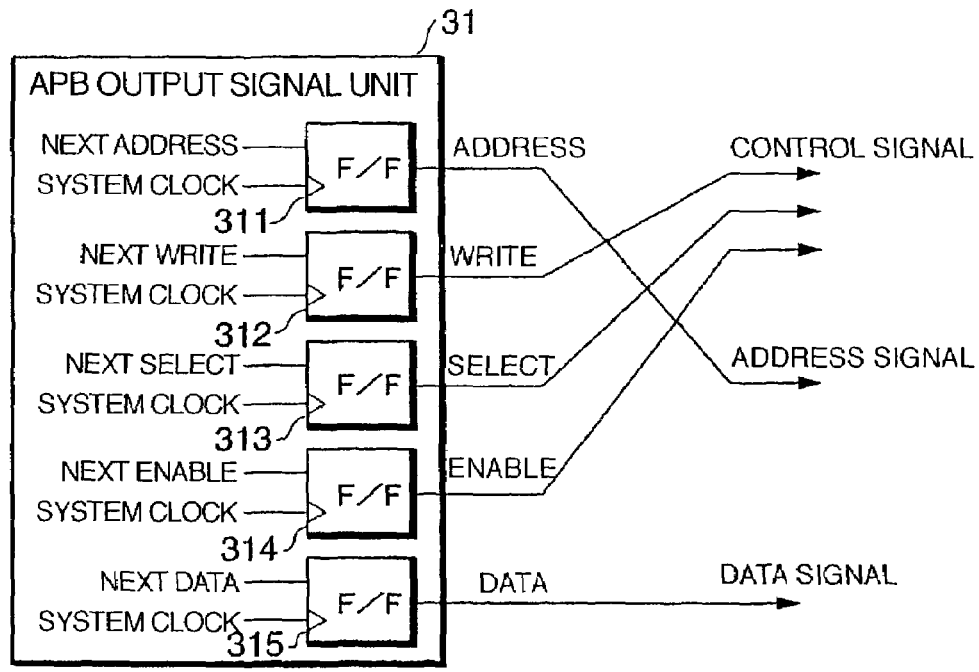
FIG. 3 is a diagram for describing a configuration of an APB output signal unit shown in FIG. 2.

An embodiment of an access control apparatus for the bus bridge circuit employed in the above-described apparatus will next be explained. FIG. 2 is a diagram for describing a first embodiment of an access control apparatus for a bus bridge circuit, of the present invention. The apparatus illustrated in the drawing is provided with an APB output signal unit 31, a status controller 32, a bus cycle end signal generator 33, a number-of-waits setting circuit 34, a count value generator 35, a control signal holding circuit 36 and a clock control circuit 37. As shown in FIG. 3, the APB output signal unit 31 outputs signals, i.e., control, address and data signals inputted from the system bus 1 and held in flip-flops therefrom according to transition states of the status controller 32, i.e., a present or this transition state thereof and a next transition state thereof. Of these signals, the control signals include a write signal, a select signal, and an enable signal for enabling access to the peripheral bus 2. As to these signals, next signals respectively held in the flip-flops 311, 312, 313, 314 and 315 are outputted as signals for this time or present signals in synchronism with the rising edge of a system clock.

Figure 4:
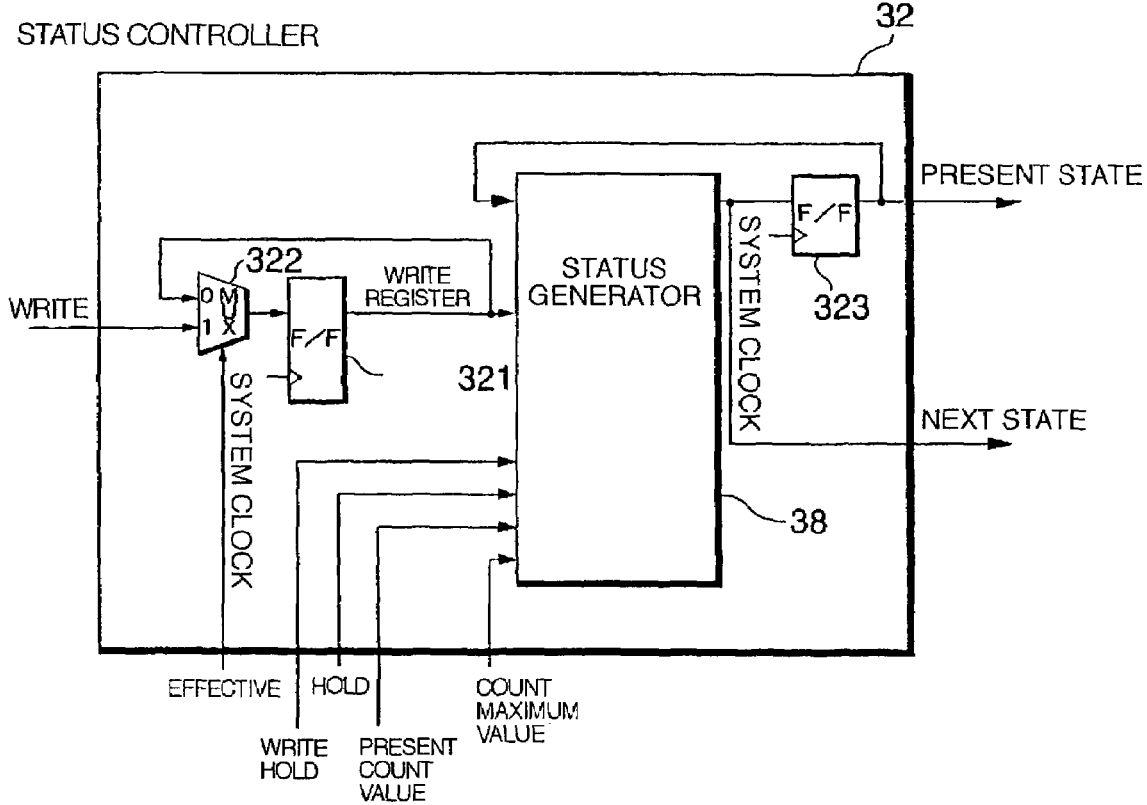
FIG. 4 is a diagram for describing a configuration of a status controller shown in FIG. 2.

As shown in FIG. 4, the status controller 32 is provided with a status generator 38. A write register signal, a write hold signal, an effective hold signal, a this-time or present count value, a count maximum value, and a present state are inputted to the status generator 38. The write register signal is a signal indicative of whether the next process awaited during a write cycle corresponds to write. As this signal, one held in a flip-flop 321 is outputted in synchronism with the system clock. A multiplexer 322 is connected to the flip-flop 321. The multiplexer 322 is a selection circuit. When an effective signal inputted to a control terminal of the selection circuit is of an H level, the multiplexer 322 outputs bit data of a write signal to the flip-flop 321. The flip-flop 321 receives the data therein in sync with the rising edge of the system clock. Thus, a write signal at the time that the effective signal is of the H level at a time P1 in FIG. 9 to be described later, for example, is outputted from the multiplexer 322. At a subsequent time P2 at which the system clock rises, the bit data of the write signal is held in the flip-flop 321 as the write register signal. On the other hand, when the effective signal inputted to the control terminal of the multiplexer 322 is of an L level, the multiplexer 322 outputs bit data of a write register signal to the flip-flop 321. The flip-flop 321 receives the data therein in synchronism with the rising edge of the system clock. Thus, a write register signal at the time that the effective signal is of the L level at a time P2 in FIG. 9 to be described later, for example, is outputted from the multiplexer 322. At a subsequent time P3 at which the system clock rises, the bit data of the write register signal is held in the flip-flop 321 as the write register signal.

Figure 9:
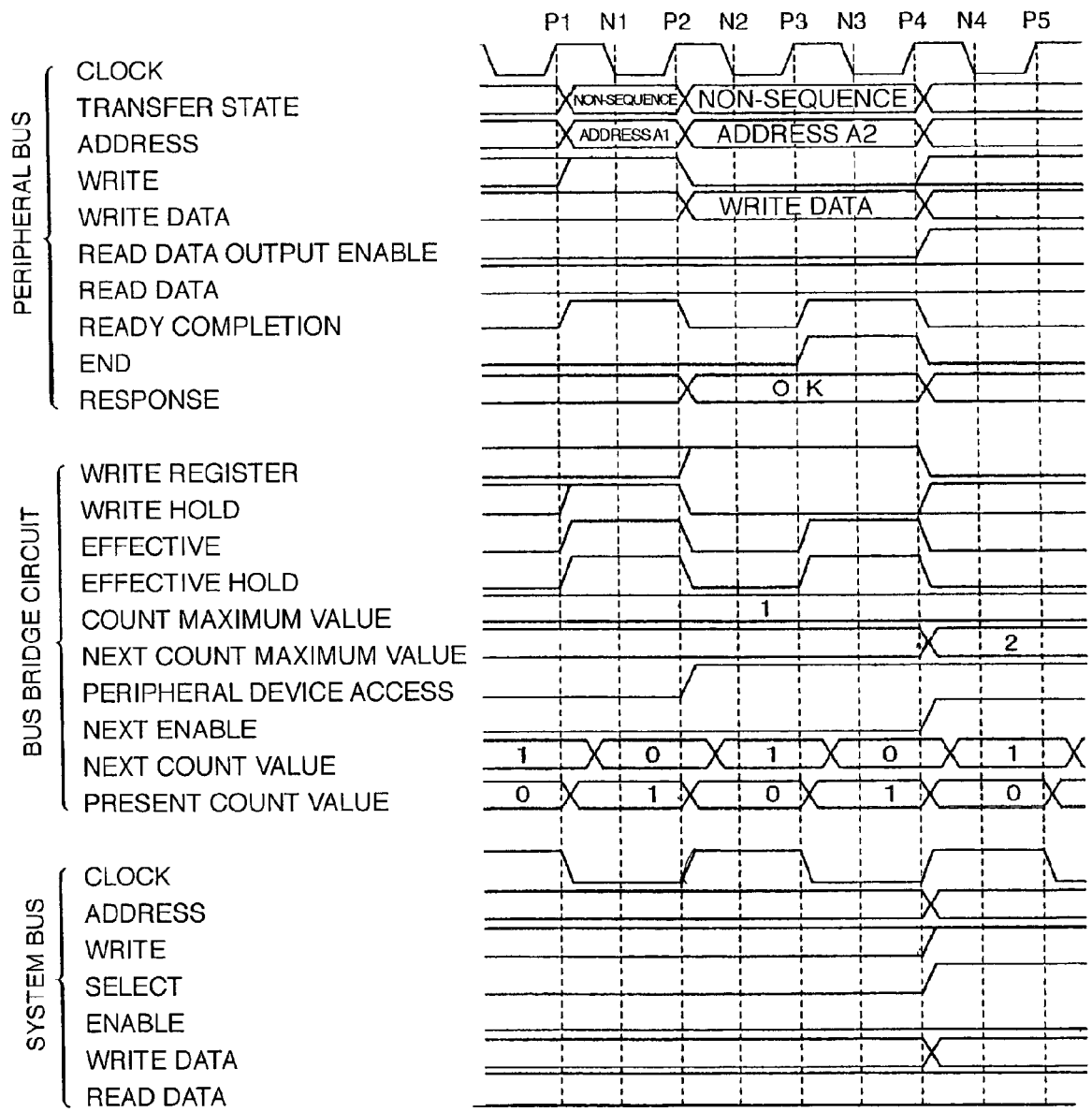
FIG. 9 is a timing chart for describing a write/read continuous access (part 1) to peripheral devices.

Further, a write signal at the time that the effective signal is H in level at the time P3 in FIG. 9 to be described later, is outputted from the multiplexer 322. At a subsequent time P4 when the system clock rises, bit data of the write signal is retained in the flip-flop 321 as the write register signal. As a result, the write signal sent from the system bus side during a period from the time P1 to the time P2 is delayed one clock within the bus bridge circuit and results in a write register signal during a period from the time P2 to a time P4 as shown in FIG. 9.

The write hold signal and the effective hold signal are respectively signals outputted after a write signal and an effective signal are held in the control signal holding circuit 36 to be described later for a predetermined period. The present count value and the count maximum value are respectively values outputted from the count value generator 35 to be described later. The output of the status generator 38 results in the display of a next state, and one obtained by synchronizing the output with the system clock and holding it in the flip-flop 323 results in the display of the present state.

Figure 5:
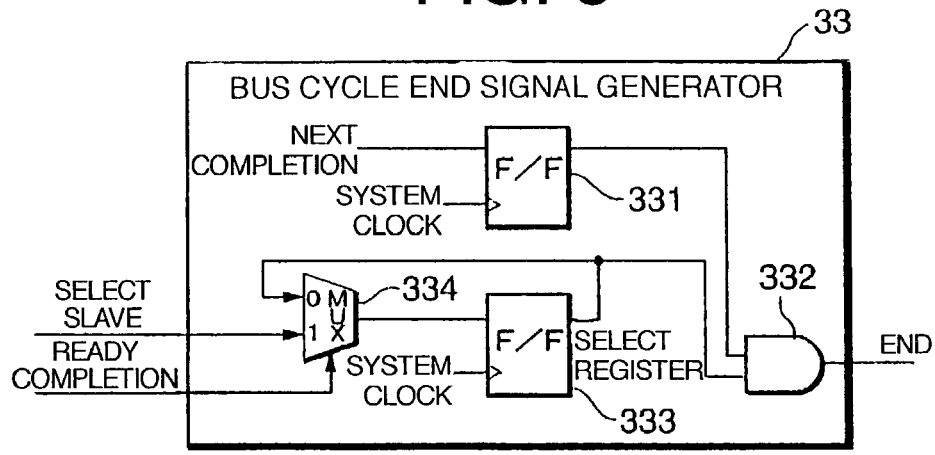
FIG. 5 is a diagram for describing a configuration of a bus cycle end signal generator shown in FIG. 2.
Figure 8:
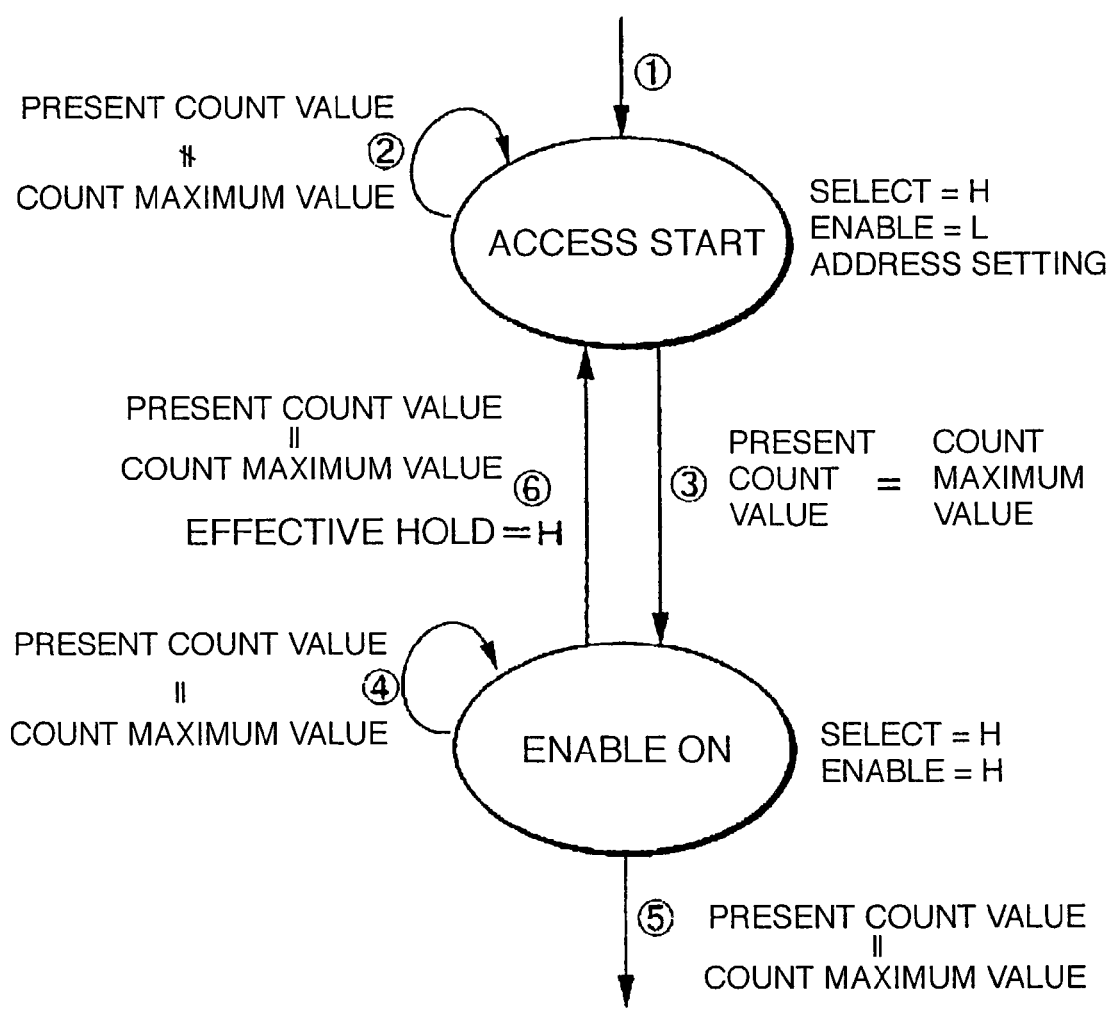
FIG. 8 is a diagram for describing state transition of the status controller.

The status controller 32 outputs a present state of access to both buses of the system bus 1 and the peripheral bus 2 and a next state of access thereto. Part of state transition at access to each peripheral device is shown in FIG. 8 to be described later. When the present access state is placed in a state of an access start, the bus bridge circuit 3 brings a select signal to an H level and causes the APB output signal unit 31 to output an address to its corresponding peripheral device. When the status controller 32 enters an accessible state in a next period or cycle of the system clock, the APB output signal unit 31 outputs an enable signal to enable its access operation to each peripheral device. As shown in FIG. 5, the bus cycle end signal generator 33 generates an end signal indicative of the termination of a bus cycle of the peripheral bus 2. This signal is generated within two cycles from the beginning of the cycle according to the AMBA specifications.

When accessing is normally completed, this signal is outputted in the form of an H level. When it is not normally completed, this signal is outputted in the form of an L level. Meanwhile, a proper region and an improper region are provided for addresses to be accessed. It is known from the beginning that when the address in the improper region is requested, accessing is not normally completed. Thus, it is examined upon decoding of the corresponding address by the decoder 14, and the result of its examination is prepared as a next end signal. The next end signal is held in the flip-flop 331 in synchronism with the system clock, where it is retained as an end signal inside the bus bridge circuit 3.

When this signal is inputted to an AND circuit 332 and the other input of the AND circuit 332 is brought to an H level, an end signal that means the completion of a bus cycle, becomes an H level. A select register signal corresponding to the output of a flip-flop 333 is inputted to the other input of the AND circuit 332. The select register signal is one latched in the flip-flop 333 with a select slave signal being synchronized with the system clock. The select slave signal is a signal indicating that the address is placed in the proper region. Bit data of the select register signal and bit data of the select slave signal are inputted to their corresponding input terminals of a multiplexer 334. When a ready completion signal that means the completion of a preparation for an access request on the system bus 1 side, is brought to an H level, the multiplexer 334 outputs bit data of a select slave signal to its corresponding input terminal of the flip-flop 333. The flip-flop 333 retains the bit data therein in synchronism with the rising edge of the system clock.

On the other hand, when the ready completion signal is brought to an L level, the multiplexer 334 outputs bit data of a select register signal to the input terminal of the flip-flop 333. The flip-flop 333 holds the bit data therein in synchronism with the rising edge of the system clock.

Figure 6:
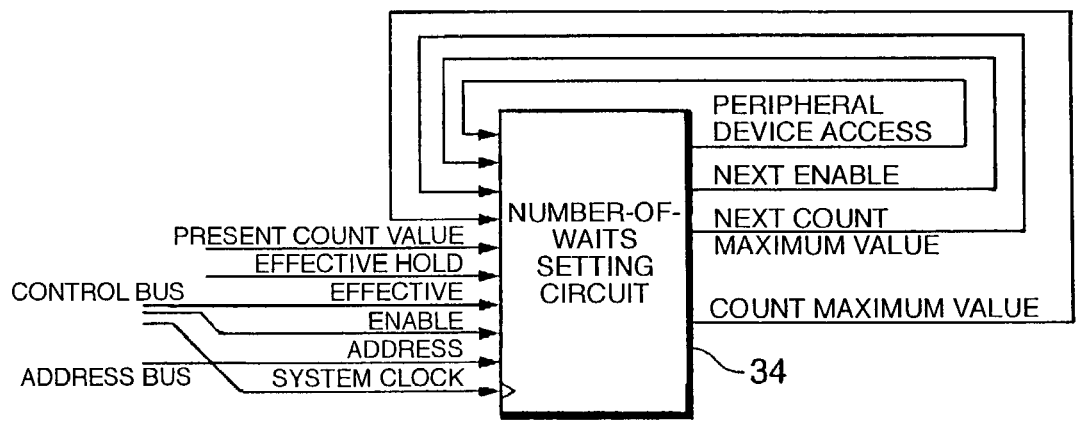
FIG. 6 is a diagram for describing a configuration of a number-of-waits setting circuit shown in FIG. 2.

The number-of-waits setting circuit 34 has a input/output relationship shown in FIG. 6, and decodes each address transmitted from the system bus 1 and sets a frequency for causing the system bus 1 to stand by The frequency is used to control the count value generator 35, the control signal holding circuit 36 and the clock control circuit 37. In order to cope even with continuous access at this time, a present wait or stand-by frequency and a next wait periodicity are set as wait frequencies. These wait frequencies are respectively set to a count maximum value and a next count maximum value used in the count value generator 35.

When an effective signal is H in level upon the rising edge of the system clock, a count maximum value and a present count value are equal to each other. When a peripheral device access signal is of an L level or when the peripheral device access signal is of an H level and an enable signal for the peripheral bus 2 is also H in level, the wait periodicity is set to the count maximum value as it is. Now, the peripheral device access signal is a signal which is brought to the H level when the effective signal is of the H level upon the rising edge of the system clock and which is brought to the L level when the effective signal is L in level and the enable signal for the peripheral bus 2 is H in level where the count maximum value and the present count value are equal to each other.

Figure 12:
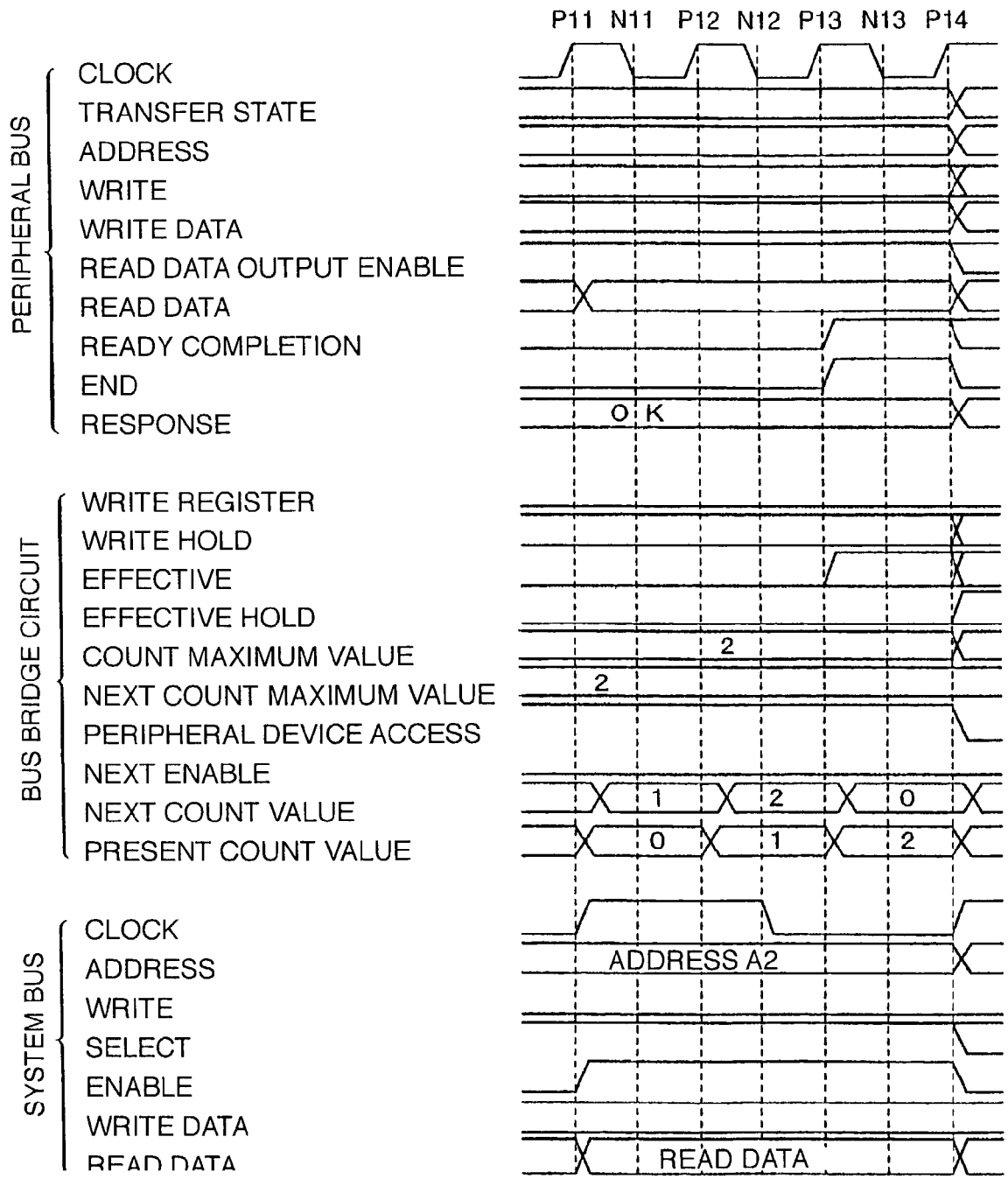
FIG. 12 is a timing chart for describing a write/read continuous access (part 4) to the peripheral devices.

Since the effective signal is of the H level at the time P2, the count maximum value and the present count value are equal to each other as "1", and the peripheral device access signal is of the L level in, for example, FIG. 9 to be described later, the wait periodicity is set to the count maximum value as it is. Since the effective signal is of an H level, a count maximum value and a present count value are equal to each other as "2", a peripheral device access signal is of an H level and an enable signal for the peripheral bus 2 is also an H level at a time P14 in FIG. 12 to be described later, the wait periodicity is set to the count maximum value as it is.

On the other hand, when the count maximum value and present count value are not equal to each other or when the peripheral device access signal is H in level and the enable signal for the peripheral bus 2 is L in level, the next enable signal is set to an H level and the wait periodicity is set to a next count maximum value. At a time P4 in FIG. 9 or 10, the effective signal is H in level and the count maximum value and the present or this count value are equal to each other, whereas the peripheral device access signal is H in level and the enable signal for the peripheral bus 2 is L in level. Therefore, the next enable signal is set to the H level and the wait periodicity of "2" is set to the next count maximum value.

When the enable signal for the peripheral bus 2 is H in level or when the enable signal for the peripheral bus 2 is L in level and the effective hold signal is H in level where the next enable signal is H in level at the rising edge of the system clock and the count maximum value and this count value are equal to each other, the value set to the next count maximum value is shifted to the count maximum value and at the same time the next enable signal is brought to an L level. Since the next enable signal is H in level and the count maximum value and this count value are equal to each other as "1", and the enable signal for the peripheral bus 2 is H in level at a time P8 in FIG. 10 by way of example, the wait periodicity "2" set to the next count maximum value is shifted to the count maximum value and the next enable signal is rendered L in level simultaneously with it.

Figure 7:
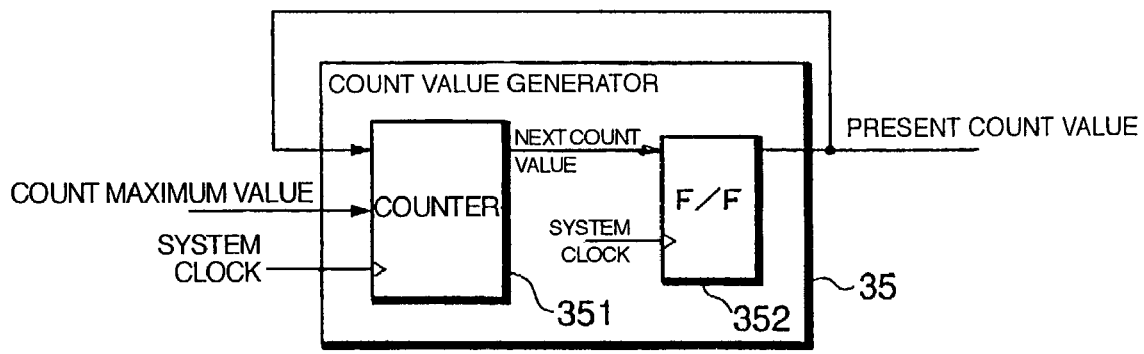
FIG. 7 is a diagram for describing a configuration of a count value generator shown in FIG. 2.

As shown in FIG. 7, the count value generator 35 comprises a counter 351 and a flip-flop 352. The counter 351 counts up the next count value in a range between a present count value and a count maximum value in synchronism with the system clock. The flip-flop 352 holds the next count value in synchronism with the system clock. Further, the flip-flop 352 generates count values necessary to control the status controller 32, the number-of-waits setting circuit 34, the control signal holding circuit 36 and the clock control circuit 37. This count value and the next count value are prepared as the count values, and the next count value is counted up.

The next count value is counted up when the immediately-preceding present count value varied according to the system clock is smaller than the count maximum value. On the other hand, when this count value is equal to the count maximum value, the present count value is set to "0". A value latched in the flip-flop having synchronized the next count value with the system clock, is set to the present or this count value at that time. Since the present count value is "0" and smaller than the count maximum value "1 at the time P1 in FIG. 9 to be described later by way of example, the next count value is counted up to "1". Thus, the next count value is set to the present count value, and the present count value is set to "1".

Since the present count value is "1" and is equal to the count maximum value at the time P2, the next count value is next set to "0", the next count value is set to the present count value, and the present count value is set to "0". This is repeated till the time P8 in FIG. 10 subsequently to the time P3. Since this count value is "0" and smaller than the count maximum value "2" at a time P9 in FIG. 11, the next count value is counted up to "1", and the next count value is set to the present count value and the present count value is set to "1". Next, since this count value is "1" and smaller than the count maximum value "2" at a time P10, the next count value is next counted up to "2", and the next count value is set to the present count value and the present count value is set to "2". Next, since the present count value is "2" and equal to the count maximum value at a time P11, the next count value is next set to "0", and the next count value is set to the present count value and the present count value is set to "0". This is repeated subsequently to a time P11 in FIG. 12.

During a period in which the count value generator 35 is being counted, i.e., the present count value is not equal to the wait periodicity corresponding to the count maximum value, the control signal holding circuit 36 outputs a signal for allowing the status controller 32 to hold the control signal inputted from the system bus 1 to the status generator 38. Namely, when the effective signal is rendered H in level, the effective hold signal is brought to an H level. When the effective signal is L in level upon the rising edge of the next system clock, and the present count value and the count maximum value are equal to each other, the effective hold signal is brought to an L level. When the present count value and the count maximum value are not equal to each other, the effective hold signal is held at the H level even if the effective signal is L in level. Similar processing is effected even on the write signal and the write hold signal.

Since the effective signal is H in level at the time P1 in FIG. 9 to be described later by way of example, the effective hold signal is rendered H in level. Since the present count value and the count maximum value are not equal at the time P3 when the effective signal is brought to the L level at the rising edge of the next system clock, the effective hold signal is held at the H level even if the effective signal is L in level.

The clock control circuit 37 divides the system clock to generate a peripheral clock. A procedure for generating it will be described. If the present count value is equal to a wait periodicity corresponding to a count maximum value on the rising edge of the system clock, then the peripheral clock is brought to an H level. Timing provided to restore the peripheral clock to the L level is varied according to whether the wait periodicity is even or odd. When the wait periodicity is even, the peripheral clock is brought to the L level when the present count value is equal to ½ of the wait periodicity on the falling edge of the system clock. When the wait periodicity is odd, the peripheral cock is rendered L in level when the present count value is equal to ½ of the wait periodicity−1 on the rising edge of the system clock.

Since the present count value is equal to the wait periodicity corresponding to the count maximum value on the rising edge P2 of the system clock in FIG. 9 to be described later by way of example, the peripheral clock is rendered H in level.

Since the wait periodicity is odd, timing provided to restore the peripheral clock to the L level is brought to an L level at the time P3 when the present count value is equal to ½ of the wait periodicity−1, i.e., "0" upon the rising edge of the system clock. Times P4 and P5 in FIG. 10 and times P6 and P7 following them are similar.

Figure 11:
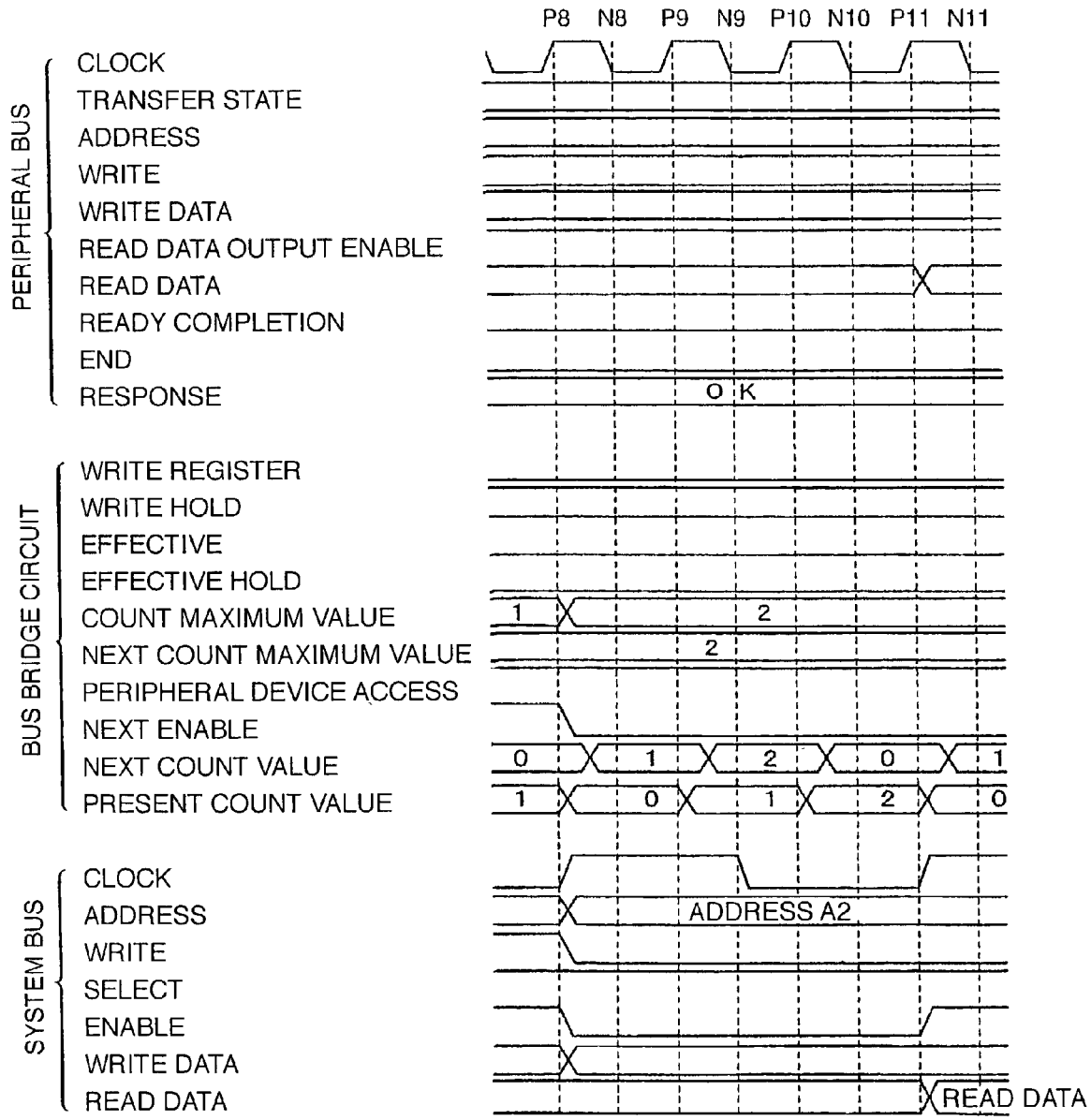
FIG. 11 is a timing chart for describing a write/read continuous access (part 3) to the peripheral devices.

Since the present count value and the wait periodicity corresponding to the count maximum value are both equal to each other as "1" at the rising edge P8 of the system clock in FIG. 11, the peripheral clock is rendered H in level. Timing provided to restore the peripheral clock to the L level is changed since the count maximum value corresponding to the wait periodicity is changed at the time P8. Namely, since the wait periodicity is even, the peripheral clock is rendered L in level at a time N9 when the present count value is equal to ½ of the wait periodicity upon the falling edge of the system clock. Since the present count value and the wait periodicity corresponding to the count maximum value are both equal to each other as "2" at a time P11 in FIG. 12, the peripheral clock is rendered H in level. At a time N12 in FIG. 12, the peripheral clock is brought to the L level in a manner similar to the time N9 in FIG. 11.

FIG. 8 is a diagram for describing part of state transition of the status controller 32. A first transition (circled numeral 1) shown in FIG. 8 occurs at the time P4 in FIG. 10 to be described later and hence an access start is carried out.

Thus, the select signal is brought to an H level and the enable signal still remains at an L level. Next, since the present count value and the count maximum value are not equal to each other at the time P5 in FIG. 10, transition processing remains in the access start from a second transition (circled numeral 2) in FIG. 8.

Figure 10:
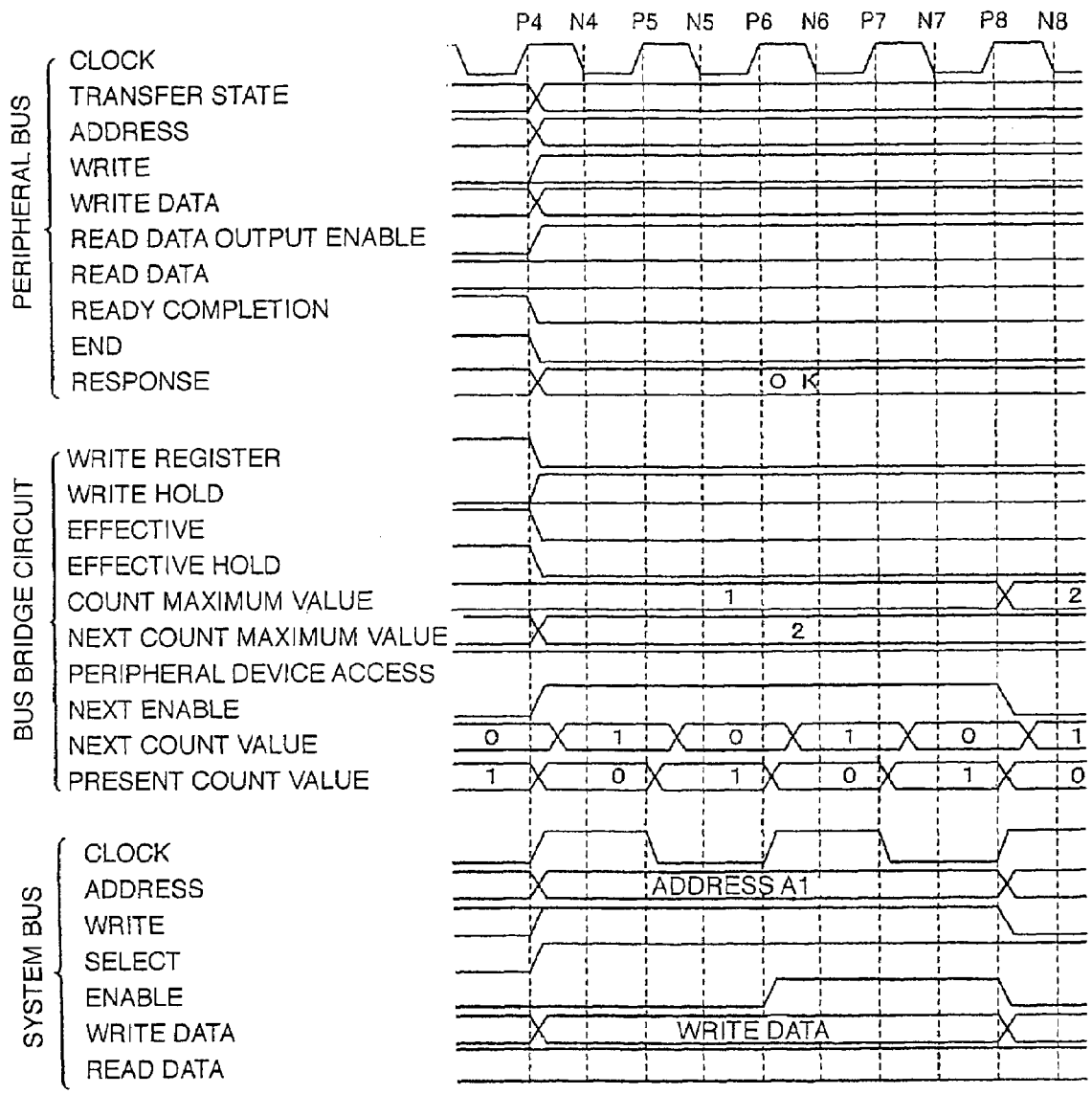
FIG. 10 is a timing chart for describing a write/read continuous access (part 2) to the peripheral devices.

Next, since the present count value and the count maximum value are equal to each other at the time P6 in FIG. 10, the processing for the state transition is brought to an enable on according to a third transition (circled numeral 3).

Next, since the present count value and the count maximum value are not equal to each other at the time P7 in FIG. 10, the processing for the state transition still remains at the enable on according to a fourth transition (circled numeral 4).

Next, since the present count value and the count maximum value are equal to each other at the time P8 in FIG. 10, the processing for the state transition is completed according to a fifth transition (circled numeral 5) in FIG. 8. If, at this time, the effective hold signal is H in level, then the processing for the state transition is returned to the access start according to a sixth transition (circled numeral 6).

The operation of the apparatus according to the above embodiment will next be explained. FIGS. 9 through 12 are respectively timing charts for describing write/read continuous accesses to the peripheral devices. The illustrated examples each show the operation of writing data of the RAM 12 in a memory area at an address A1 by the CPU 11 and reading data at an address A2 into the RAM 12 subsequently to it.

The address A1 is an address in a memory area lying within the first peripheral device 21. Throughput on the system side is twice that of the first peripheral device 21. Completing work or task such as accessing according to an operating speed of the first peripheral device 21 needs a time interval equivalent to two periods or cycles of the system clock with respect to workload processable within one cycle of the system clock with the throughput of the CPU 11 or the like connected to the system bus 1. Thus, the number of waits used for the first peripheral device 21 is determined as "1". Thus, the decoder 14 decodes the address A1 to obtain the number of waits as "1".

On the other hand, the address A2 is an address in a memory area lying within the second peripheral device 22. A time interval corresponding to three cycles of the system clock is needed to complete accessing according to an operation speed of the second peripheral device 22. Thus, the number of waits used for the second peripheral device 22 is determined as "2". Thus, the decoder 14 decodes the address A2 to obtain the number of waits as "2".

Now consider where a write access request is transferred from the CPU 11 to the bus bridge circuit 3 through the system bus 1 upon the rising edge P1 of the system clock in FIG. 9. At this time, the effective signal has been set to the H level by the decoder 14. Further, the write signal is H in level. Thus, the bus bridge circuit 3 makes preparations for the following write access. Namely, since the effective signal is H in level on the rising edge P2 of the system clock, a transfer state signal, an address A1, a write signal and a select signal transferred from the system bus 1 side are sampled at the time P2 and retained in their corresponding flip-flops. At the time P2, the number of waits corresponding to "1" is set to the count maximum value, and "1" is set to the next count value.

On the rising edge P4 of the system clock, the present count value becomes equal to the count maximum value. Thus, write data transferred from the RAM 12 through the system bus 1 by the CPU 11 is sampled at the time P4 and transferred to the first peripheral device 21 via the peripheral bus 2 together with the address A1, write signal and select signal held in the flip-flops. Consequently, the first peripheral device 21 starts to make preparations for write access. At the time P4, the write signal is L in level and the effective signal is H in level. This means that read access is made after the write access. At the time P4, a transfer state signal, an address A2, a read signal and a select signal transferred from the system bus 1 side by the CPU 11 are sampled and held in their corresponding flip-flops. Simultaneously, the number of waits corresponding to "2" is set to the next count maximum value at the time P4.

On the rising edge P6 of the system clock in FIG. 10, the present count value becomes equal to the count maximum value. Consequently, the enable signal for the peripheral bus 2 is rendered H in level at the time P6. Thus, the first peripheral device 21 starts execution of a write access. Also upon the rising edge P8 of the system clock, the present count value becomes equal to the count maximum value within the bus bridge circuit 3. Consequently, the enable signal is rendered L in level at the time P8. Thus, the write access of the first peripheral device 21 is terminated. At this time, the end signal is brought to an H level and hence a response signal indicative of "OK or an error" is outputted. Timing provided to sample the write data is determined according to the specifications of the first peripheral device 21.

At the time P8, the transfer state signal, address A2, read signal and select signal held in the flip-flops are sent to the second peripheral device 22 through the peripheral bus 2. Thus, the second peripheral device 22 starts to make preparations for read access. At the time P8, the number of waits "2" corresponding to the next count maximum value is set to the count maximum value.

On the rising edge P11 of the system clock in FIG. 11, the present count value becomes equal to the count maximum value. Consequently, the enable signal for the peripheral bus 2 is rendered H in level at the time P11. Thus, the second peripheral device 22 starts execution of the read access. On the rising edge P14 of the system clock in FIG. 12, read data outputted from the second peripheral device 22 to the system bus 1 through the peripheral bus 2 and the bus bridge circuit 3 is sampled by the CPU 11. Incidentally, the sampling of the read data is performed when a read data output enable signal is H in level. At the time P14, the present count value becomes equal to the count maximum value within the bus bridge circuit 3. Consequently, the enable signal for the peripheral bus 2 is rendered L in level at the time P14. Thus, the read access of the second peripheral device 22 is terminated.

According to the first embodiment as described above, the dividing ratio of the peripheral clock to the system clock and the number of waits corresponding to the frequency of the system clock for holding the state of the status controller are determined by the addresses, and the timing provided to perform the access process to each peripheral device is adjusted. It is therefore possible to adjust the prolongation of the access time without reducing or lowering the frequency of the system clock. If an attempt is made to adjust it while the frequency of the system is being reduced, then the clock frequency must be lowered according to the latest peripheral device. In the description of the above embodiment, for example, the clock frequency must be lowered or deboosted according to the second peripheral device 22. Thus, the access process to the first peripheral device 21 also needs a processing time similar to the second peripheral device 22.

On the other hand, there is also considered a method of delaying timing provided to restore an enable signal to an L level without a drop in clock frequency. However, such a method could not be used for convenience of processing in the case of the write based on the write/read continuous access in the description of the above embodiment. Thus, the method of the present invention results in the best method. Incidentally, while the first embodiment has described the case in which the wait periodicity of the first peripheral device 21 is set as "1" and the wait periodicity of the second peripheral device 22 is set as "2", the present invention is not limited to or by it. It is needless to say that various wait frequencies can be set to the respective peripheral devices respectively.

Second Preferred Embodiment

Figure 13:
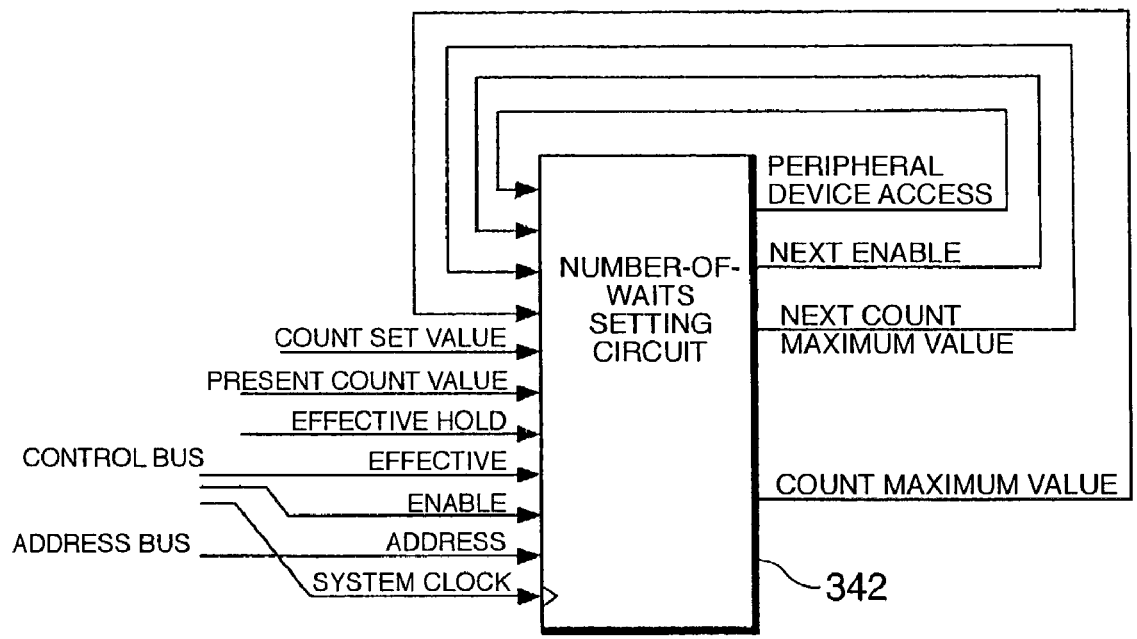
FIG. 13 is a diagram for describing a second embodiment of an access control device for a bus bridge circuit, of the present invention.

A second embodiment of the present invention will next be described. FIG. 13 is a diagram for describing the second embodiment showing an access control apparatus for a bus bridge circuit, according to the present invention. The second embodiment is different from the first embodiment only in number-of-waits setting circuit in terms of hardware. An illustrated number-of-waits setting circuit 342 receives a count set value therein in addition to the respective inputs of the number-of-waits setting circuit 34. The count set value is inputted via a keyboard or the like connected to a keyboard input circuit corresponding to one of peripheral devices in the case of a cellular telephone, for example. Further, the count set value is stored in an unillustrated reprogrammable ROM or the like connected to the system bus 1 shown in FIG. 1 or stored in an unillustrated reprogrammable ROM or the like lying within the bus bridge circuit 3. Thus, a wait periodicity obtained upon decoding each address can be changed. Count set values may be set to some of a plurality of peripheral devices or all of them.

The operation of the access control apparatus according to the second embodiment will next be described. Access to each peripheral device with a wait periodicity "1" set to the count set value results in the same operation as the peripheral device 21 described as to the operation of the apparatus according to the first embodiment in FIGS. 9 through 12, for example. Access to each peripheral device with a wait periodicity "2" set to the count set value becomes the same operation as the peripheral device 22 described as to the operation of the apparatus according to the first embodiment in FIGS. 9 through 12 by way of example.

On the other hand, a wait periodicity "0" may be set as the count set value. Access to each peripheral device with the wait periodicity "0" set as the count set value results in the same operation as the conventional apparatus. This will be described with reference to FIG. 14.

Figure 14:
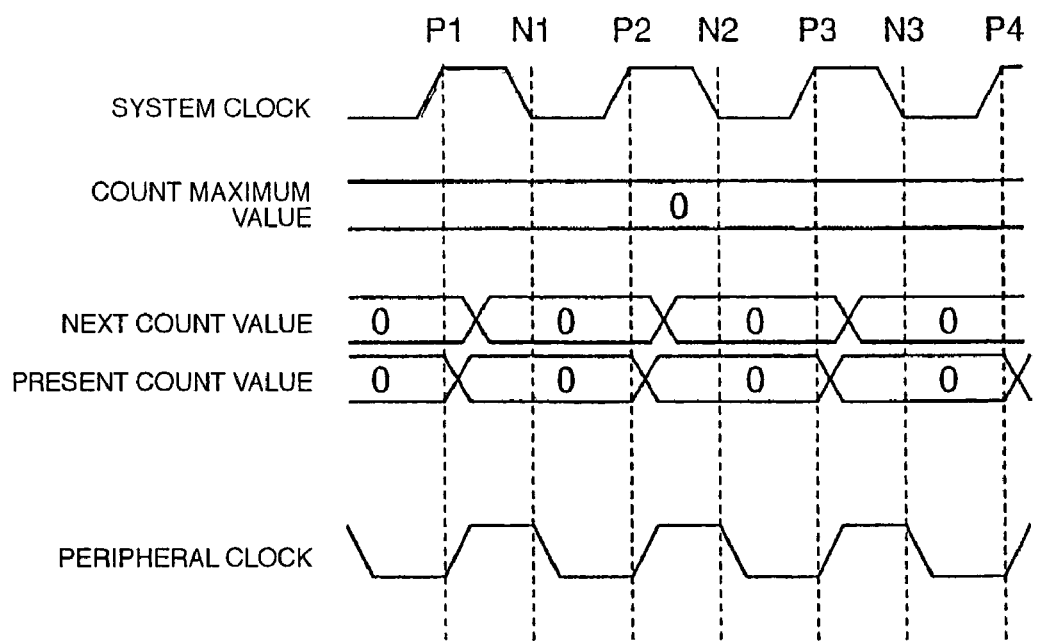
FIG. 14 is a timing chart for describing operation at the time that a count maximum value is set as 0.

Referring to FIG. 14, the present count value is equal to a count maximum value, i.e., "0" on the rising edge of a system clock. Therefore, a peripheral clock is brought to an H level. Timing provided to restore the peripheral clock to an L level is set to an L level at a time N1 when the present count value is equal to "0 corresponding to ½ of the count maximum value on the falling edge of the system clock, since the count maximum value is "0" and even. As a result, a dividing ratio results in "1" and the cycle of the peripheral clock becomes equal to that of the system clock. It is thus possible to carry out control similar to the case in which even the operation of each peripheral device has heretofore been performed by use of only the system clock. However, the rise and fall at the edges of the peripheral clock are slightly delayed.

According to the second embodiment as described above, an advantageous effect is obtained in addition to the advantageous effect of the first embodiment in that an access time for each address can be adjusted. Thus, even when a change in peripheral device is made, suitable access corresponding to operational performance of the changed peripheral device can be performed.

Third Preferred Embodiment

Figure 15:
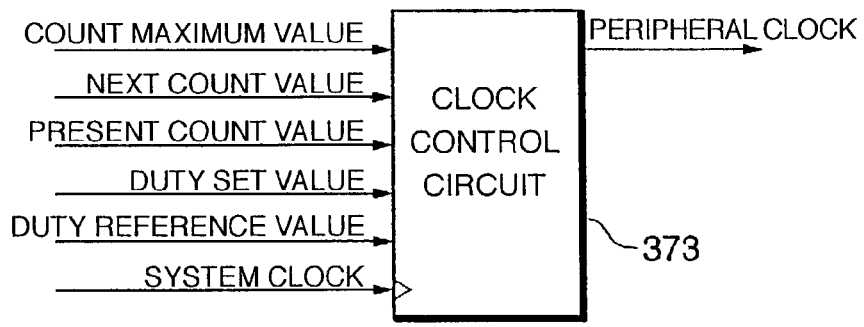
FIG. 15 is a diagram for describing a third embodiment of an access control device for a bus bridge circuit, of the present invention.

A third embodiment of the present invention will next be described. FIG. 15 is a diagram for describing the third embodiment showing an access control apparatus for a bus bridge circuit, according to the present invention. The third embodiment is different from the first embodiment in clock control circuit alone in terms of hardware. An illustrated clock control circuit 373 receives a duty set value and a duty reference value therein in addition to the respective inputs of the clock control circuit 37. These values are inputted thereto and stored therein by a method similar to the method described in the second embodiment. Consequently, a duty ratio of a peripheral clock can be changed.

The duty ratio indicates a ratio of a period for an H or L level to the cycle or period of a pulse wave such as a clock. Namely, the duty reference value is set to the H level or L level. When the duty reference value is set to the H level, the duty ratio can be changed with a half cycle of the H level period of the peripheral clock as the reference. When the duty reference value is set to the L level, the duty ratio can be changed with a half cycle of the L level period of the peripheral clock as the reference. The duty ratio is adjusted by a time interval obtained by multiplying the duty set value by a half cycle of a system clock.

Figure 16:
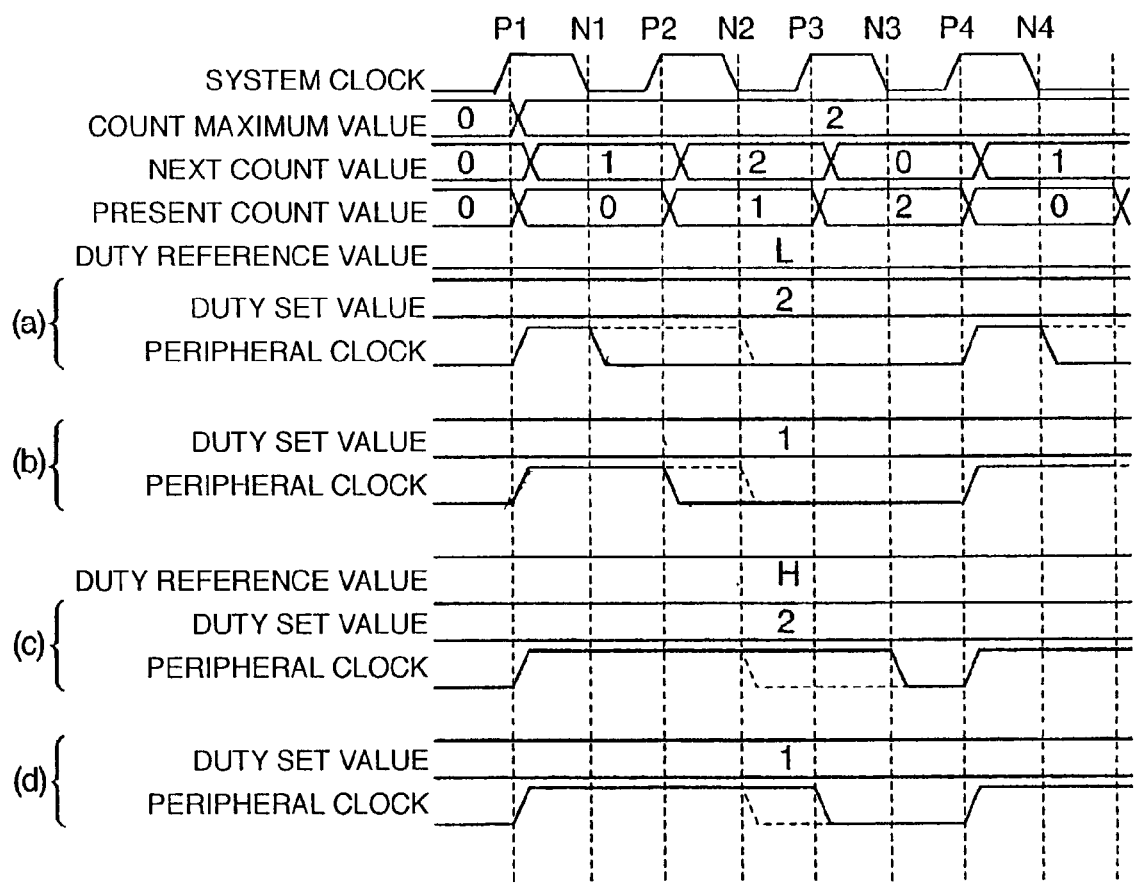
FIG. 16 is a timing chart for describing operation of the access control device according to the third embodiment where a dividing ratio is odd and a count maximum value is even.
Figure 17:
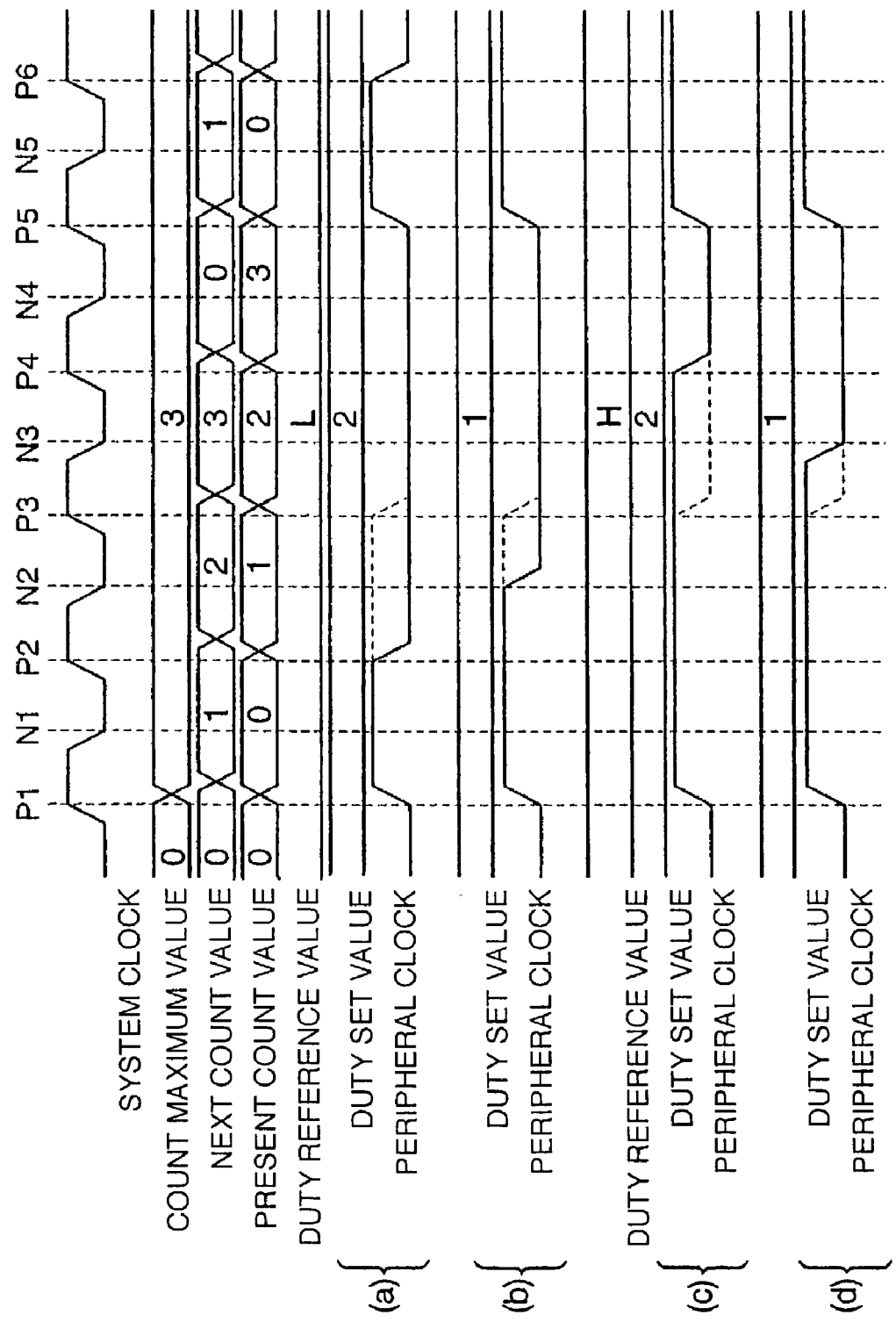
FIG. 17 is a timing chart for describing operation of the access control device according to the third embodiment where a dividing ratio is even and a count maximum value is odd.

FIGS. 16 and 17 are respectively diagrams for describing methods of adjusting duty ratios. When the cycle of a peripheral clock reaches three and four times the cycle of a system clock in the examples illustrated in FIGS. 16 and 17, the falling edge of the peripheral clock can be adjusted so as to extend by one cycle or half cycle of the system clock. Such an adjustment varies according to whether a dividing ratio of the peripheral clock is even or odd. This is because according to either of these, the edge of the system clock corresponding to the falling edge of the peripheral clock changes to either a rise or a fall. Thus, duty ratio adjusting methods include eight types shown below according to the setting of a duty reference value and a duty set value. Before the description thereof, the peripheral clock is first brought to an H level if the present count value is equal to a count maximum value on the rising edge of the system clock. The peripheral clock is brought down under the following conditions according to whether the count maximum value is even or odd.

When the count maximum value is even in FIG. 16, the dividing ratio becomes odd and the peripheral clock is brought down at the following points of time in FIGS. 16(*a*) through 16(*d*). Since the falling edge of the peripheral clock occurs at the falling edge of the system clock when the duty reference value is L in level and the duty set value is even in FIG. 16(*a*), the peripheral cock falls when the present count value=count maximum value/2−duty set value/2. In the illustrated example, the peripheral clock falls at a time N1 of the present count value=2/2−2/2=0. Thus, the duty ratio is changed as indicated by dotted lines to solid lines shown in the drawing.

When the duty reference value is L in level and the duty set value is odd in FIG. 16(*b*), the peripheral clock falls when the present count value=count maximum value/2−(duty set value+1)/2 at the falling edge of the system clock. In the illustrated example, the peripheral clock falls at a time P2 of the present count value=2/2−(1+1)/2=0.

When the duty reference value is H in level and the duty set value is even in FIG. 16(*c*), the peripheral clock falls when the next count value=count maximum value/2+duty set value/2 at the falling edge of the system clock. In the illustrated example, the peripheral clock falls at a time N3 of the next count value=2/2+2/2=2.

When the duty reference value is H in level and the duty set value is odd in FIG. 16(*d*), the peripheral clock falls when the next count value=count maximum value/2+(duty set value+1)/2 at the rising edge of the system clock. In the illustrated example, the peripheral clock falls at a time P3 of the next count value=2/2+(1+1)/2=2.

When the count maximum value is odd in FIG. 17, the dividing ratio becomes even and the peripheral clock is brought down at the following points of time in FIGS. 17(*a*) through 17(*d*). When the duty reference value is L in level and the duty set value is even in FIG. 17(*a*), the peripheral cock falls when this count value=(count maximum value−1)/2−duty set value/2 at the rising edge of the system clock. In the illustrated example, the peripheral clock falls at a time P2 of the present count value=(3−1)/2−2/2=0.

When the duty reference value is L in level and the duty set value is odd in FIG. 17(*b*), the peripheral clock falls when the present count value=(count maximum value−1)/2−(duty set value−1)/2 at the falling edge of the system clock. In the illustrated example, the peripheral clock falls at a time N2 of the present count value=(3−1)/2−(1−1)/2=1.

When the duty reference value is H in level and the duty set value is even in FIG. 17(*c*), the peripheral clock falls when the present count value=(count maximum value−1)/2+duty set value/2 at the rising edge of the system clock. In the illustrated example, the peripheral clock falls at a time P4 of the present count value=(3−1)/2+2/2=2.

When the duty reference value is H in level and the duty set value is odd in FIG. 17(*d*), the peripheral clock falls when the present count value=(count maximum value−1)/2+(duty set value+1)/2 at the falling edge of the system clock. In the illustrated example, the peripheral clock falls at a time N3 of the present count value=(3−1)/2+(1+1)/2=2. In the respective cases, however, the present count value and the next count value cannot be set to values less than or equal to "0"or greater than or equal to the count maximum value.

The operation of the access control apparatus according to the third embodiment will next be described. While the timing provided so as to sample the write data for each peripheral device has been explained as based on the specifications of the peripheral device in the description of the operation of the first embodiment, a description will be made here of a case in which it is timing provided for the falling edge of the peripheral clock. In this case, the peripheral device 21 starts sampling at the time P7 without immediately performing sampling even if the enable signal for the peripheral bus 2 is brought to the H level at the time P6 in FIG. 10. Since, however, the write data has already been transferred onto the peripheral bus 2 at the time P4 much antecedent to the time P6, the state of a data signal is already sufficiently stable. It is thus possible to start sampling at once.

Consequently, duty control shown in FIG. 17(*b*) is carried out. In this case, the dividing ratio is "2" and the count maximum value is "1". Further, the duty reference value is L in level and the duty set value is "1". In doing so, the falling edge is shifted to the time N6 at the time P7 of the peripheral clock in FIG. 10. At this time, the sampling of the write data is started. Thus, the peripheral device 21 is given allowance of a half cycle of the system clock until the operation thereof is completed.

Figure 18:
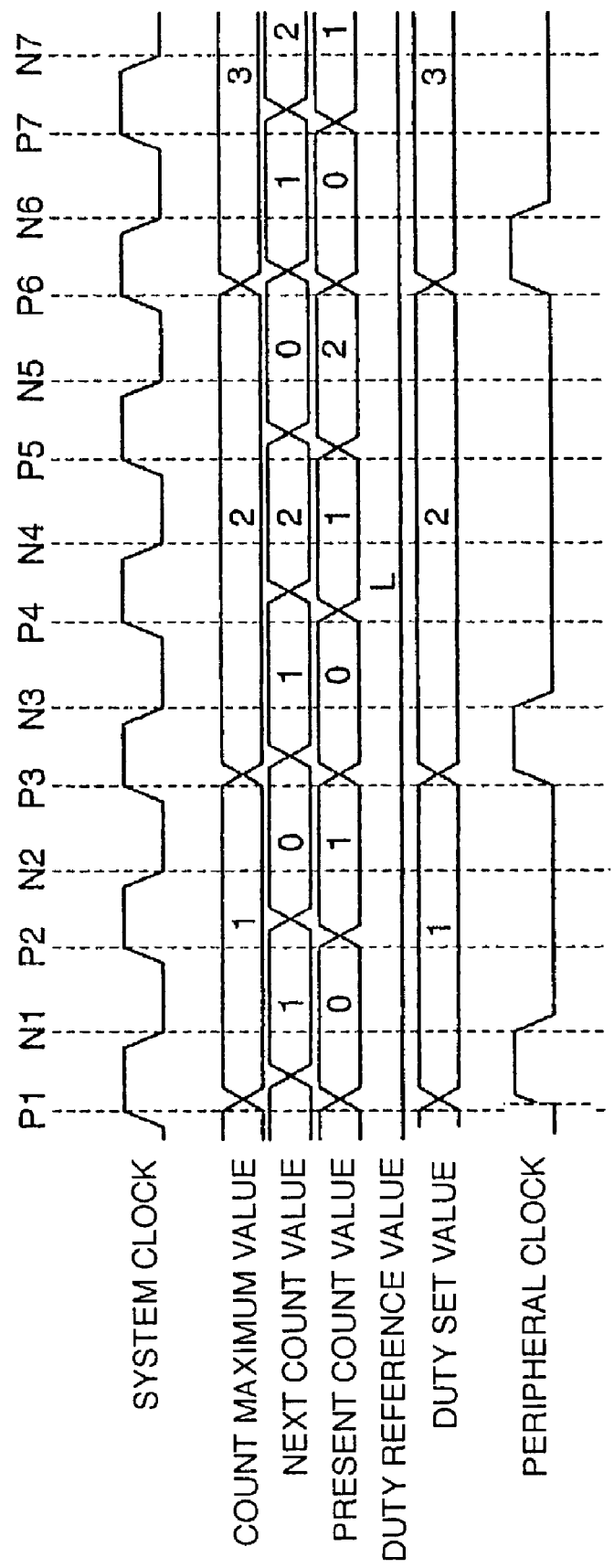
FIG. 18 is a timing chart for describing operation of the access control device according to the third embodiment where a duty set value is made equal to a count maximum value.

Incidentally, while the above example of operation has described the case in which the duty set value is fixed to "1", for example, the present invention is not limited to it. A plurality of values each corresponding to a dividing ratio of a clock are prepared and a duty ratio corresponding to the dividing ratio of the clock may be set based thereon. When the duty set value is set so as to become equal to the count maximum value as shown in FIG. 18 by way of example, the falling edge of the peripheral clock can be always brought about after the elapse of a time interval corresponding to the half cycle of the system clock as seen from the rising edge thereof. Consequently, the peripheral device 21 is capable of starting operating at the earliest possible time while the operation thereof is always being synchronized with a predetermined time having elapsed since the rising edge of the peripheral clock. Thus, the maximum allowance can be given to the peripheral device 21.

According to the third embodiment as described above, an advantageous effect is obtained in addition to the advantageous effect of the first embodiment in that the duty ratio of the peripheral clock can be changed, i.e., the falling timing of the peripheral clock can be changed. Various control can be carried out with the falling timing.

Incidentally, while the third embodiment has described the case in which the duty set value is set as 1 and the case in which the duty set value is set to the plural values according to the dividing ratio of the clock an the duty ratio corresponding to the division of the clock is set, the present invention is not limited to the same. Of course, the duty set value may be changed using other parameters other than the dividing ratio of the clock.

Fourth Preferred Embodiment

Figure 19:
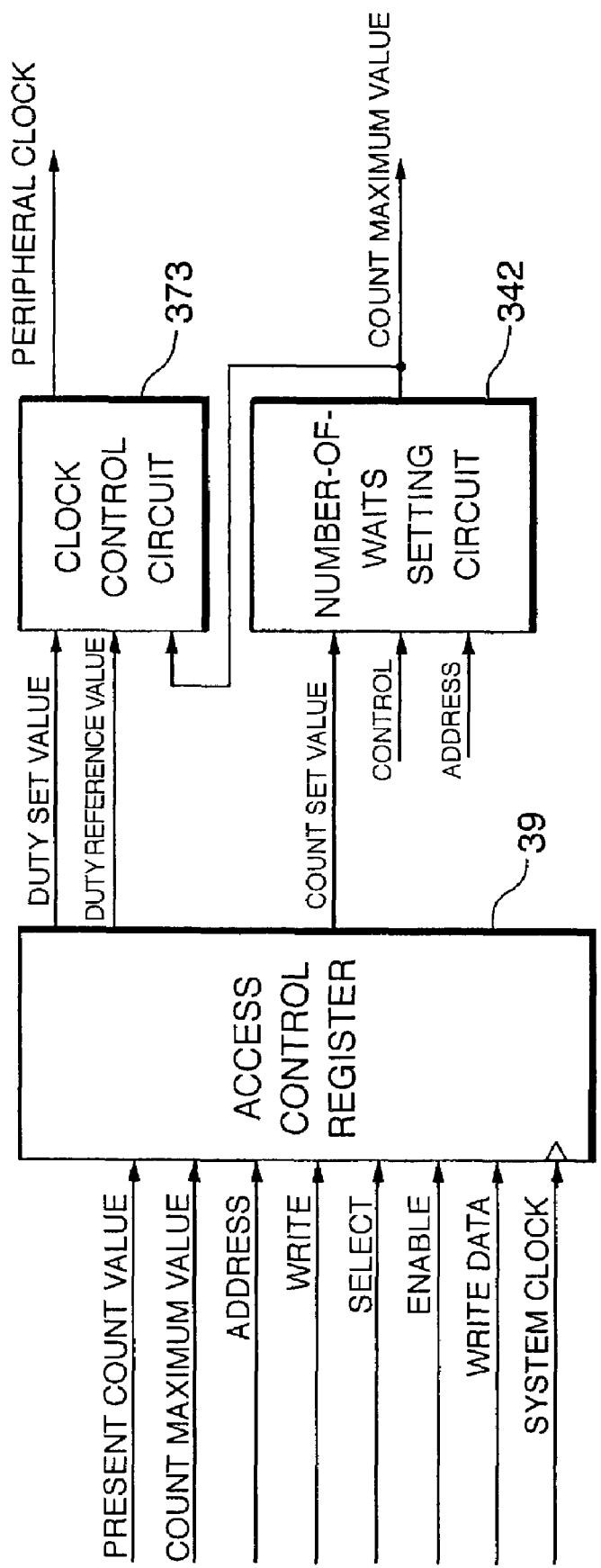
FIG. 19 is a diagram for describing a fourth embodiment of an access control device for a bus bridge circuit, of the present invention.

A fourth embodiment of the present invention will next be described. FIG. 19 is a diagram for describing the fourth embodiment showing an access control apparatus for a bus bridge circuit, according to the present invention. The access control apparatus according to the fourth embodiment is characterized in that it combines the number-of-waits setting circuit 342 of the access control apparatus according to the second embodiment and the clock control circuit 373 of the access control apparatus according to the third embodiment, and an access control register 39 is additionally provided. The access control register 39 holds signals set to control the number-of-waits setting circuit 342 and the clock control circuit 373. Namely, the access control register 39 retains a count set value, a duty set value and a duty reference value therein. The access control register 39 comprises a reprogrammable ROM or the like, for example, and stores therein a value manually set to each peripheral device by an operator of electronic equipment. Decoding of an address for accessing each peripheral device is carried out by use of the access control register 39.

The operation of the access control apparatus according to the fourth embodiment will next be described. The access control apparatus according to the fourth embodiment performs a suitable operation for changing the wait periodicity for write access to "2", changing the wait periodicity for read access to "0", reducing the peripheral device 21 in speed, speeding up the peripheral device 22, and using the falling timing of the peripheral clock in some kind of control in the timing charts of FIGS. 9 through 12 which describes the operation of the access control apparatus according to the first embodiment, for example. Therefore, an advantageous effect is obtained in addition to the advantageous effects obtained in the first embodiment, the second embodiment and the third embodiment in that the present embodiment can cope even with finer access control.

Incidentally, while the fourth embodiment has shown that one wait periodicity is set to one address in the access control register 39, the present invention is not limited to it. A plurality of wait frequencies may be set even to one address so that the operation of the access control apparatus can be changed according to various conditions. No limitation is imposed on the case where the wait periodicity and the duty ratio are respectively discretely set. They may be changed simultaneously in one write access. Accessing is not necessarily limited to the write access to the access control register 39. The read access is also allowed for the access control register 39 so that the contents set thereto can be confirmed.

Incidentally, the present invention is not limited to the above-described embodiments. It is needless to say that various changes can be made thereto within the scope of the substance thereof. While the respective embodiments have described the AMBA specifications-based cases, for example, the present invention is not limited to or by the specifications. The present invention is applicable to all of such cases that a period for processing such as access is limited to a fixed clock cycle. The processing is not limited to the access either and the present invention can be applied to any process. The idea of the present invention is that a system clock is divided to produce clocks each corresponding to a peripheral clock, and each peripheral device is operated based on the clock and the system side is allowed to stand by during its operation.

Thus, specific means for determining a dividing ratio of a peripheral clock is not necessarily limited to means for determining a wait periodicity by a number-of-waits setting circuit. Means for outputting the peripheral clock is not limited to a clock control circuit. Specific means for allowing a system bus to wait or stand by is not limited to a count value generator and a control signal holding circuit. An apparatus in which these are replaced with other means by a conventional method, falls within the scope of the present invention. Namely, the method of the present invention regardless of these means is the substance of the present invention.

According to the present invention as described above in detail, a bus bridge circuit for connecting a system bus and a peripheral bus determines a dividing ratio of a peripheral clock with respect to a system clock by an address, and a wait periodicity corresponding to a system clock frequency for holding the state of a status controller to thereby adjust timing provided to perform processing such as access to each peripheral device. It is therefore possible to adjust the prolongation of a time for the processing such as the access without bringing the frequency of the system clock down. Allowing the setting of a wait periodicity for each address to be changed makes it possible to carry out suitable processing such as access according to operational performance of each post-change peripheral device even when the peripheral device is changed. Further, the falling timing of the peripheral clock is allowed to change according to a change in duty ratio. This can be used in each of various control timings. Furthermore, it is possible to realize such control that these are taken together to sufficiently make good use of finer processing, i.e., the system side and the peripheral side are associated closely with each other to filly utilize throughput capacity for both, and the processing can be completed as early as possible.

While the preferred form of the present invention has been described, it is to be understood that modifications will be apparent to those skilled in the art without departing from the spirit of the invention. The scope of the invention is to be determined solely by the following claims.

What is claimed is:

1. An access control device for a bus bridge circuit connected between a first bus and a second bus connected to peripheral devices, all on a single chip, comprising:
 a status controller for determining a state of access to the first and second buses;
 a number-of-waits setting circuit for setting a wait periodicity corresponding to an operating speed of each of the peripheral devices connected to the second bus according to an address corresponding to an access request to the second bus sent from the first bus, in response to the access request, the first bus entering a standby state over a duration equivalent to the wait periodicity;

a count value generator for generating a present count value up to the wait periodicity set by the number-of-waits setting circuit;

a control signal holding circuit for holding a control signal for holding a state of the second bus at the selling of the wait periodicity by the number-of-waits setting circuit during a count period of the count value generator and maintaining an access state of the status controller; and a clock control circuit for dividing a clock for the first bus responsive to the wait periodicity set by the number-of-waits setting circuit and the present count value, and outputting a result of the division to the second bus.

2. The access control device according to claim 1, wherein the number-of-waits setting circuit sets the wait periodicity according to a set value capable of being set and changed to a desired value from outside the bus bridge circuit regardless of the address.

3. The access control device according to claim 2, wherein the clock control circuit sets a desired duty ratio from outside the bus bridge circuit regardless of the address, and allows the divided clock output to the second bus to fall in a time that is determined by the desired duty ratio and that is set between continuous rising edges thereof.

4. The access control device according to claim 1, wherein the clock control circuit sets a desired duty ratio from outside the bus bridge circuit regardless of the address, and allows the divided clock output to the second bus to fall in a time that is determined by the desired duty ratio and that is set between continuous rising edges thereof.

5. The access control device according to claim 1, wherein the peripheral devices have different operating speeds.

6. A bus bridge circuit connected between a first bus and a second bus connected to peripheral devices, all on a single chip, the bus bridge circuit comprising:

a number-of-waits setting circuit which sets a wait periodicity corresponding to an operating speed of each of the peripheral devices connected to the second bus in response to an address signal, the address signal being sent from the first bus and specifying corresponding peripheral devices, the first bus entering a standby state over a duration equivalent to the wait periodicity;

a count value generator which generates a present count value up to the wait periodicity set by the number-of-waits setting circuit; and a clock control circuit which divides a clock for the first bus responsive to the wait periodicity set by the number-of-waits setting circuit and the present count value, and outputs a result of the division to the second bus.

7. The bus bridge circuit according to claim 6, wherein the number-of-waits setting circuit sets the wait periodicity according to a set value capable of being set and changed to a desired value from outside the bus bridge circuit regardless of the address.

8. The bus bridge circuit according to claim 7, wherein the clock control circuit sets a desired duty ratio from outside the bus bridge circuit regardless of the address, and allows the divided clock output to the second bus to fall in a time that is determined by the desired duty ratio and that is set between continuous rising edges thereof.

9. The bus bridge circuit according to claim 6, wherein the clock control circuit sets a desired duty ratio from outside the bus bridge circuit regardless of the address, and allows the divided clock output to the second bus to fall in a time that is determined by the desired duty ratio and that is set between continuous rising edges thereof.

10. The bus bridge circuit according to claim 6, further comprising a control signal holding circuit which holds a control signal for holding a state of the second bus at the setting of the wait periodicity by the number-of-waits setting circuit during a count period of the count value generator and maintains an access state of the bus bridge circuit.

11. The bus bridge circuit according to claim 6, wherein the peripheral devices have different operating speeds.

* * * * *